May 6, 1958   J. TUSA ET AL   2,832,974
APPARATUS FOR ROUGHENING RUBBER SOLES
Filed Nov. 14, 1955   2 Sheets-Sheet 1

Inventors
J. TUSA &
A. MARCANIK
By Young, Emery
& Thompson
Attorneys

May 6, 1958 J. TUSA ET AL 2,832,974
APPARATUS FOR ROUGHENING RUBBER SOLES
Filed Nov. 14, 1955 2 Sheets-Sheet 2
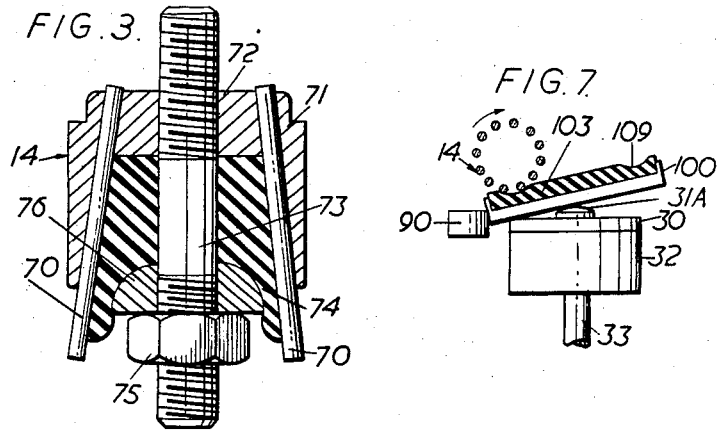
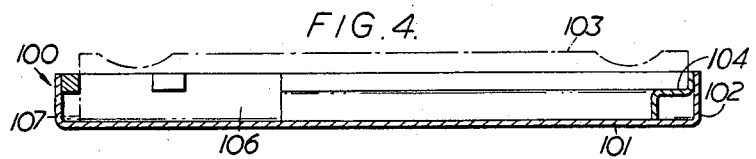
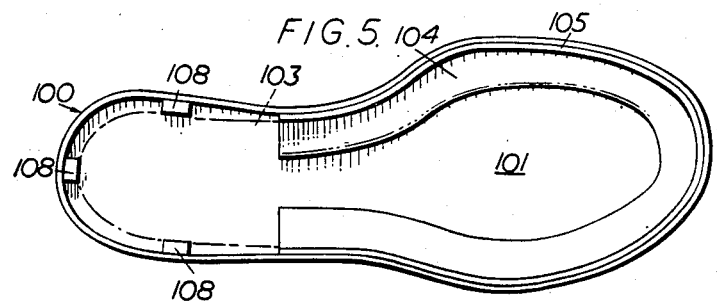
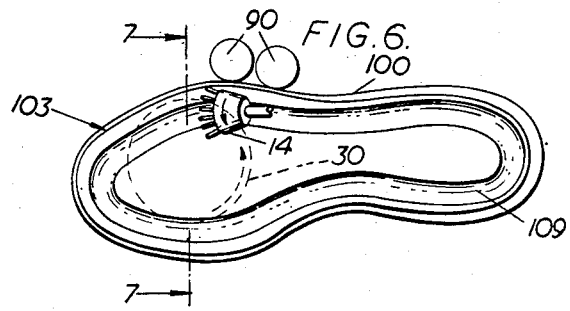
Inventors
J. TUSA &
A. MARCANIK
By Young, Emery & Thompson
Attorneys

United States Patent Office 2,832,974
Patented May 6, 1958

2,832,974
APPARATUS FOR ROUGHENING RUBBER SOLES

John Tusa, Horndon-on-the-Hill, and Antonin Marcanik, Grays, England, assignors to Bata Shoe Company Inc., Belcamp, Md.

Application November 14, 1955, Serial No. 546,749

4 Claims. (Cl. 12—17)

This invention relates to apparatus for roughening the upper surface of a formed rubber sole for a shoe or the like article of footwear (hereinafter referred to simply as a "shoe").

The object of roughening the upper surface of a rubber sole is to provide an anchorage for cement used to bind the sole and the upper of the shoe together.

The present invention is an apparatus for roughening the upper surface of a formed sole comprising a rotatable support for the sole, a rotary sole-roughening device directed towards said support, and guide means beside said support for maintaining the sole periphery at a predetermined distance from the roughening device against the action of this device during circulatory movement of the sole in its own plane relative to the roughening device, so that the roughening is effected along an endless zone of the sole surface.

The invention also is an apparatus for roughening the upper surface of a formed sole comprising a frame adapted to accommodate the sole, a rotary sole-roughening device, a rotatable support opposed to said roughening device and adapted to maintain said frame in a tilted position with the sole pressed against said roughening device, and guide means beside the support adapted to be engaged by the periphery of said frame to maintain the periphery at a uniform distance from said roughening device during circulatory movement of the frame in its own plane relative to the roughening device.

Preferably, the roughening device is directed towards the plane of the sole and lies at an angle to said plane.

Figure 1:
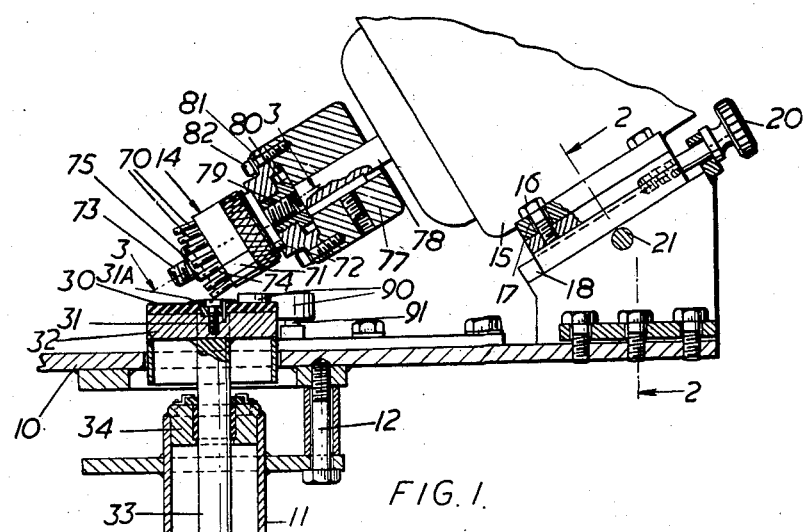
Figure 2:
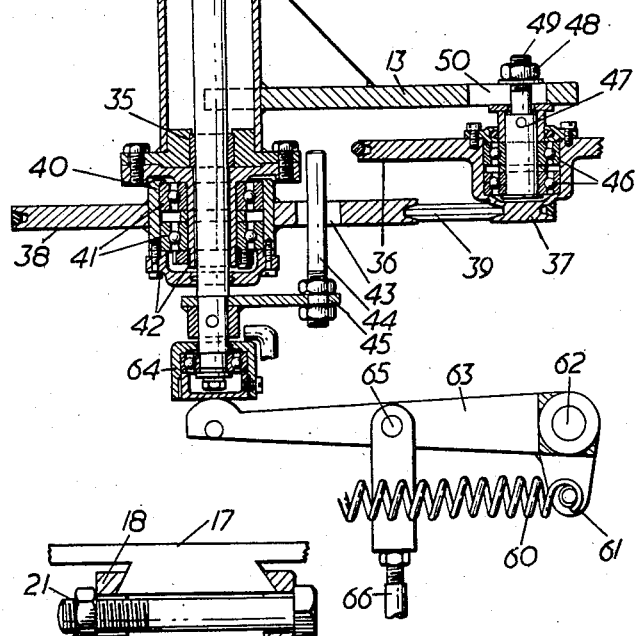

The invention will now be described by way of example with reference to the accompanying drawings, in which:

Fig. 1 is a sectional elevation of a machine embodying apparatus according to the invention for roughening a formed sole. Fig. 2 is a section on the line 2—2 of Fig. 1. Fig. 3 is a detail view of a rotary roughening device, being a section on the line 3—3 of Fig. 1. Fig. 4 is a longitudinal section of a frame for accommodating the sole, which is shown in dot-dash outline, and Fig. 5 is a corresponding plan. Fig. 6 is a diagram illustrating in plan the operation of the apparatus on the sole. Fig. 7 is a section on the line 7—7 of Fig. 6.

The machine shown in Figs. 1 and 2 has a frame including a horizontal platform 10 which is supported by a pedestal, not shown. The frame also includes a vertical tubular body 11 which is secured to the platform 10 by a number of screws, one of which is indicated by 12. The frame also includes an arm 13 which projects from the tubular body 11.

The rotary roughening device is indicated generally by 14. This device is driven by an electric motor 15, the base of which is secured by screws 16 to a block 17 which is mounted in a slideway 18. Components of this slideway are secured by screws 19 to the platform 10. The block 17 is adjustable along the slideway by means of an adjusting screw 20, and the block is securable in its position of adjustment by a clamping screw 21. The motor 15 is set at a steep inclination, so that the common axis of this motor and of the rotary device 14 reclines towards the horizontal; thus, in the example, said axis is at an angle of about thirty degrees to the platform 10. By virtue of the adjusting screw 20, the rotary device 14 can be set in any desired position along its axis. That is to say, the working level of the rotary device 14 can be regulated in relation to the platform 10.

The machine also includes a circular turntable 30 which extends through a circular opening in the platform 10 and which in the example includes a rubber disc. This disc is secured by a central screw 31 to a circular plate 32 secured to the top end of a vertical shaft 33, which is journalled in bearings 34 and 35 at the top and bottom of the tubular body 11. The screw 31 also secures in place a ferrule with a rounded head 31A. The shaft 33 is rotatable by a belt-driven pulley 36, which is carried by the arm 13. Between the pulley 36 and the shaft 33 there is a speed-reducing driving connection consisting of a small pulley 37, a large pulley 38 and a belt 39. The small pulley 37 is an extension of the boss of the belt-driven pulley 36. The large pulley 38 is secured to a boss 40 which is journalled in bearings 41 on a downward extension 42 of the tubular body 11. The pulley 38 has a pin-and-slot connection with the shaft 33. This connection consists of a radial slot 43 in the pulley 38 and a vertical pin 44, which is secured to an arm 45 on the shaft 33. The belt-driven pulley 36 has its boss journalled on ball-bearings 46 on a vertical pin 47. This pin is secured to the arm 13 by a nut 48 on a screw-threaded extension 49 of the pin. The arrangement is such that the shaft 33 is driven by the pulley 36 at reduced speed and also such that the position of the pin 47 in relation to the tubular body 11 can be adjusted to regulate the tension of the belt 39.

In the example, the turntable 30 is supported in its working position by a long powerful spring 60. This spring 60 has an anchorage (not shown) at its left-hand end to the frame of the machine. The spring is hooked at its other end to one arm 61 of a bell-crank lever, which is fulcrumed at 62 on the frame of the machine. The other arm 63 of this lever is applied to a thrust-bearing 64 mounted on the foot of the shaft 33. The arrangement is such that the turntable 30 is resiliently supported at its working level. The arm 63 is pivotally connected at 65 to a link 66, the foot of which is connected to a pedal (not shown). The operator of the machine can depress this pedal to lower the arm 63 from below the shaft 33. Whenever he does this, the shaft 33 lowers under its own weight and accordingly withdraws the turntable 30 from below the work. The up-and-down movements of the shaft 33 caused by the operation of the spring 60 and the pedal do not affect the driving connection between the pulley 38 and the shaft 33 by virtue of the pin-and-slot connection 43, 44.

The rotary roughening device is a flexible-pin tool consisting of a circular series of flexible steel pins or prongs 70. These pins, as Fig. 3 shows, are supported by a down-turned cup-shaped metal member consisting of a cylindrical wall 71 and a base 72. The pins are fitted through holes provided for them in the base 72. The pins rest against the inner surface of the cylindrical wall 71, which surface is tapered so that the pins lie somewhat splayed apart. The cup-shaped member is secured to a short spindle 73, which is screw-threaded at both ends. The base 72 is screwed on the upper end of the spindle 73. The pins are held in place by a heavy rubber plug 74, which fits neatly into the interior of the cup-shaped member 71, 72. The rubber plug serves to hold the pins tightly against the inner surface of the cylindrical wall 71 by the action of a clamping nut 75, which is screwed on the lower end of the spindle 73. The nut 75 acts on the rubber through a washer 76, which has a curved surface serving to expand the rubber outwards against the prongs. The arrangement therefore is such that the pins are held securely in place; but they can be quite easily removed when worn out by unscrewing the nut 75 and removing the plug 74; after which the pins can be replaced by new ones.

The rotary tool 14, as Fig. 1 shows, is coupled to a flywheel 77 which is secured to the shaft 78 of the electric motor 15. The coupling consists of a central nut 79 with a flange 80 and a ring 81 secured by screws 82 to the flywheel 77. The upper end of the spindle 73 is screwed hard into the nut 79, so that the base 72 and the flange 80 grip the ring 81 securely and thus affix the tool 14 to the flywheel. The tool can be easily detached by unscrewing it from the nut 79.

The machine also includes two guide rollers 90 each supported by a pin 91 on the platform 10. The rollers are arranged side-by-side close to the turntable 30, their location being seen best in Fig. 6. The rollers reach to a level somewhat higher than the turntable, as Fig. 1 shows.

The apparatus also comprises frames to accommodate rubber soles each to be roughened on its upper surface in a narrow zone extending endlessly at a selected distance from the sole periphery. In the example shown, the frame 100 is made of sheet metal, comprising mainly a flat base 101 with an upstanding peripheral wall 102. The sole is shown in dot-dash outline 103. It will be seen that the shape of the frame in plan corresponds approximately with the shape of the sole. In the example, the frame 100 is devised to suit a sole with a heel. Accordingly, there is secured inside the frame base and wall a seat consisting of a ledge 104 with a peripheral wall 105. This seat fits close against the frame wall 102 and extends round the entire sole area in front of the heel, so that a recess 106 is left for the heel 107, Fig. 4.

In the example, the frame 100 is designed for a sole which, in the finished shoe, will have a welt which is widest around the toe and front portion in general and which is narrowest around the heel and which merges from widest to narrowest at the shank. Accordingly, the wall 102 is provided with distance pieces 108 which space the outer surface of the wall 102 at a greater distance from the periphery of the heel than from the periphery of the toe, as Figs. 5 and 6 show.

In operation of the machine, with the roughening device 14 rotating at high speed and the turntable 30 rotating at low speed, the operator depresses the pedal to lower the turntable and places a frame 100 containing a sole 103 so that the outer surface of the frame wall 102 comes against the two guide rollers 90. It is to be noted that the rotary device rotates in the direction such that its wire pins 70 work on the upper surface of the sole in the outwards direction, namely towards the guide rollers 90. Moreover, the turntable 30 rotates counter-clockwise, so that its active portion beneath the device 14 is moving away from the wire pins 70. The operator releases the pedal, so that the spring 60 forces the turntable to rise and bring the upper surface of the sole against the rotating brush. The arrangement is such that the flexible pins 70 on the underside of the tool 14, reacting against the upward pressure of the turntable 30, press down upon the work, namely the sole 103 and causes the frame 100 to uptilt at its opposite side, so that as Fig. 7 shows the frame is held by the tool 14, the guide rollers 90, the adjacent edge of the turntable 30 and the central head 31A, which serves as an upstanding boss. Moreover, the frame in its uptilted setting is thrust, by the action of the tool on the sole, against the guide rollers 90, and is forced by the turntable to move in a circulatory manner in the work, namely in its own inclined plane under the guidance of the rollers, against which the circulating outer surface of the frame wall 102 is maintained by the tool action. The tool 14 therefore works in, and roughens the surface of the sole around, a groove-like zone 109. Although the distance between the outer surface of the frame wall 102 and the tool 14 remains uniform, the zone 109 extends endlessly, as Fig. 6 shows, at a predetermined distance from the sole periphery which varies between its widest around the toe portion to its narrowest around the heel portion.

It is important to note that, in the operation of the machine, only two positively rotating elements act upon the sole, namely the slowly rotating turntable 30 and the quickly rotating tool 14. In the example, the guide rollers 90 rotate also, but they purely re-act upon the work, being rotated by it. The following describes more specifically what transpires in the functioning of the apparatus.

The periphery portion of the vertical-axis circular turntable 30 travels directly underneath the working location of the machine, the central boss 31A being above the level of the peripheral portion. The vertical plane of the inclined axis of the tool 14 is nearly tangential to the turntable, as Fig. 6 shows, and pins 70 of the tool project from their rotary holder 71 with their free ends inclined downwards into the working location. Thus, when a sole unit 100 is put on the rotating turntable and against the freely journalled rollers 90 the boss and peripheral portion below the unit and the rotating tool above it hold it in a plane inclined to the turntable. Accordingly, the pins 70 at any instant on the underside of the tool apply to the sole unit a force transverse to said vertical plane and towards said rollers; and the peripheral portion applies to the sole unit a tangential force. These two transverse and tangential forces alone co-operate to effect the requisite circulatory movement of the sole unit in its inclined plane under the guidance of the rollers. The path of the sole surface 109 to be roughened is through the working location, being locally coincident with said vertical plane, as will be clear from Fig. 6. Moreover, the peripheral portion engaging the sole unit at any instant moves underneath the pin holder 71 towards and past the free ends of the lowermost pins then engaging the sole surface.

We claim:

1. An apparatus for roughening the upper surface of a formed sole and comprising a circular turntable rotatable about a vertical axis, means for rotating said turntable so that a peripheral portion of it travels directly underneath a working location, a central boss on said turntable above the level of said peripheral portion, a rotary sole-roughening device mounted to rotate about an axis which is inclined to the horizontal in a vertical plane nearly tangential to said turntable, said device being disposed directly above the working location, and guide rollers freely journalled side-by-side near said turntable, the construction being such that when a sole unit is put on the rotating turntable and against said rollers the boss and peripheral portion below the unit and the rotating device above it hold it in a plane inclined to the turntable, the underside of the device applies to the sole unit a force transverse to said vertical plane and towards said rollers and said peripheral portion applies to the sole unit a tangential force, said transverse and tangential forces alone co-operating to effect a circulatory movement of the sole unit in said inclined plane under the guidance of said rollers in a path through the working location, which path is locally coincident with said vertical plane, so that the sole surface is roughened by said device along an endless zone.

2. An apparatus for roughening the upper surface of a formed sole and comprising a circular turntable rotatable about a vertical axis, means for rotating said turntable so that a peripheral portion of it travels directly underneath a working location, a central boss on said turntable above the level of said peripheral portion, a rotary sole-roughening device mounted to rotate about an axis which is inclined to the horizontal in a vertical plane nearly tangential to said turntable, said device being disposed directly above the working location, and guide means disposed alongside said turntable, the construction being such that when a sole unit is put on the rotating turntable and against said guide means the boss and peripheral portion below the unit and the rotating device above it hold it in a plane inclined to the turntable, the underside of the rotating device applies to the sole unit a force transverse to said vertical plane and towards said guide means and said peripheral portion applies to the sole unit a tangential force, said transverse and tangential forces alone co-operating to effect a circulatory movement of the sole unit in said inclined plane under the guidance of said guide means in a path through the working location, which path is locally coincident with said vertical plane, so that the sole surface is roughened by said device along an endless zone.

3. An apparatus for roughening the upper surface of a formed sole and comprising a circular turntable rotatable about a vertical axis, means for rotating said turntable so that a peripheral portion of it travels directly underneath a working location, a rotary sole-roughening device mounted to rotate about an axis which is inclined to the horizontal in a vertical plane nearly tangential to said turntable, said device being disposed directly above the working location, and guide rollers freely journalled side-by-side near said turntable, the construction being such that when a sole unit is put on the rotating turntable and against said rollers the peripheral portion below the unit and the rotating device above it hold it between them, the underside of the device applies to the sole unit a force transverse to said vertical plane and towards said rollers and said peripheral portion applies to the sole unit a tangential force, said transverse and tangential forces alone co-operating to effect a circulatory movement of the sole unit under the guidance of said rollers in a path through the working location, which path is locally coincident with said vertical plane, so that the sole surface is roughened by said device along an endless zone.

4. An apparatus for roughening the upper surface of a formed sole and comprising a circular turntable rotatable about a vertical axis, means for positively rotating said turntable so that a peripheral portion of it travels directly underneath a working location, a rotary sole-roughening device mounted to rotate about an axis which is inclined to the horizontal in a vertical plane nearly tangential to said turntable, said device being disposed directly above the working location, means for positively rotating said device, and guide means disposed alongside said turntable, the construction being such that when a sole unit is put on the rotating turntable and against said guide means the peripheral portion below the unit and the rotating device above it hold it between them, the turntable and device being the only positively rotated elements acting upon the sole unit, so that the underside of the device applies to the sole unit a force transverse to said vertical plane and towards said guide means and said peripheral portion applies to the sole unit a tangential force, said transverse and tangential forces alone co-operating to effect a circulatory movement of the sole unit under the guidance of said guide means in a path through the working location, which path is locally coincident with said vertical plane, so that the sole surface is roughened by said device along an endless zone.

References Cited in the file of this patent

UNITED STATES PATENTS

| 1,980,376 | Brostrom | Nov. 13, 1934 |
| 2,046,147 | Card | June 30, 1936 |
| 2,544,870 | Westberg | Mar. 13, 1951 |
| 2,590,136 | Stacey | Mar. 25, 1952 |